Sept. 9, 1952 P. C. GOLDMARK ET AL 2,610,258
PHONOGRAPH ADAPTOR FOR LONG PLAYING RECORDS
Filed March 3, 1949 3 Sheets-Sheet 1
Fig. 1,
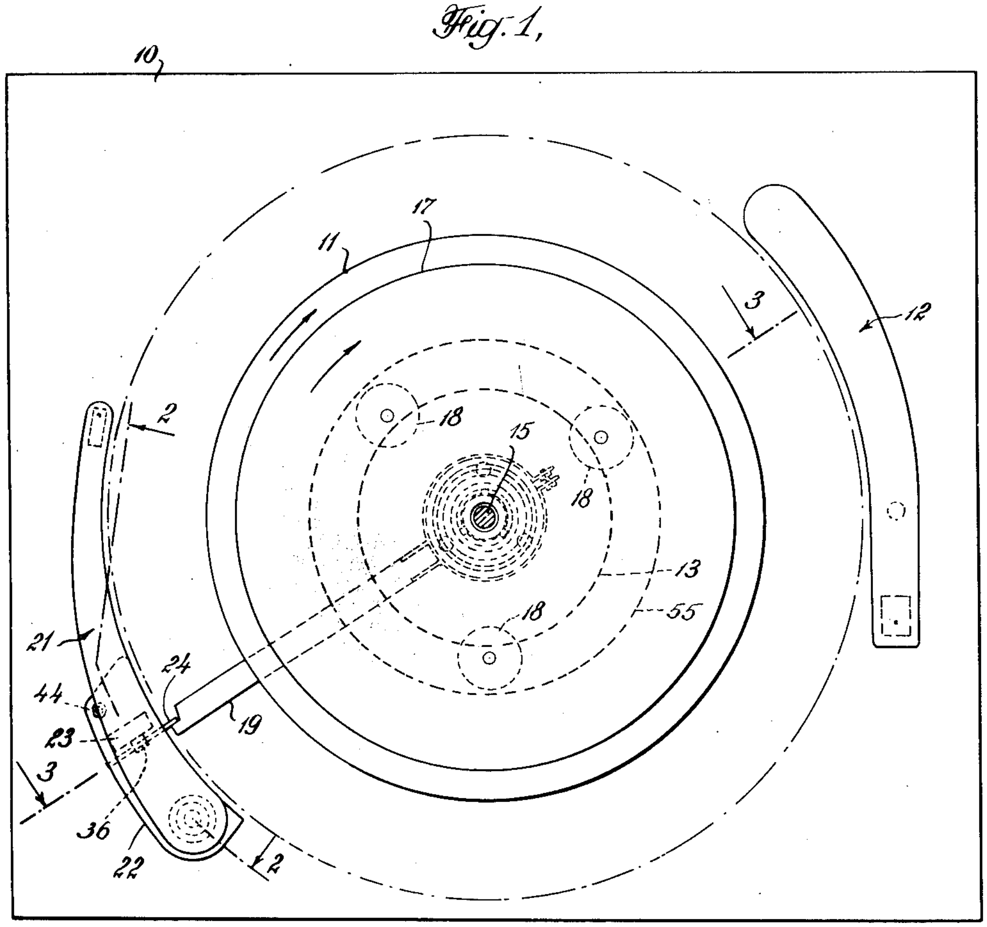
Fig. 2, Fig. 11,
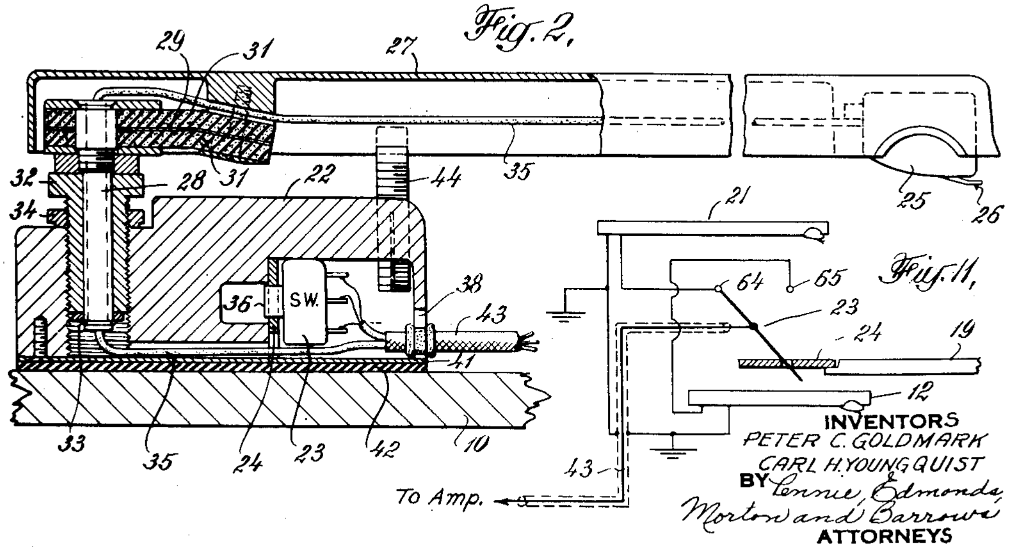
INVENTORS
PETER C. GOLDMARK
CARL H. YOUNGQUIST
BY Pennie, Edmonds, Morton and Barrows
ATTORNEYS Sept. 9, 1952 P. C. GOLDMARK ET AL 2,610,258

PHONOGRAPH ADAPTOR FOR LONG PLAYING RECORDS

Filed March 3, 1949 3 Sheets-Sheet 2

INVENTORS
PETER C. GOLDMARK
CARL H. YOUNGQUIST
BY Pennie, Edmonds, Morton and Barrows
ATTORNEYS Sept. 9, 1952 P. C. GOLDMARK ET AL 2,610,258
PHONOGRAPH ADAPTOR FOR LONG PLAYING RECORDS
Filed March 3, 1949 3 Sheets-Sheet 3
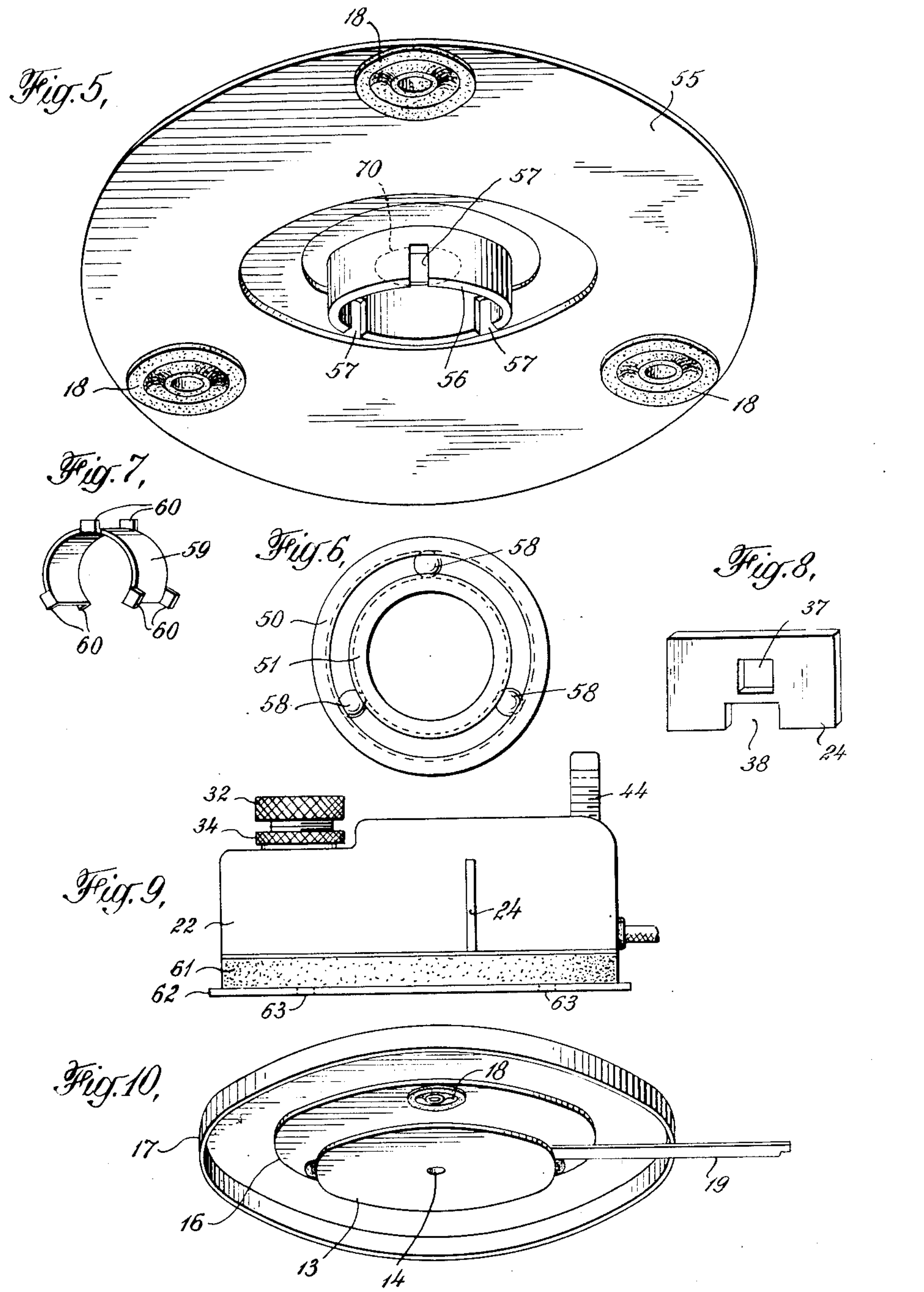
Fig. 5, Fig. 6, Fig. 7, Fig. 8, Fig. 9, Fig. 10,
INVENTORS
PETER C. GOLDMARK
CARL H. YOUNGQUIST
BY
Pennie, Edmonds, Morton and Barrows
ATTORNEYS Patented Sept. 9, 1952 2,610,258

UNITED STATES PATENT OFFICE 2,610,258

PHONOGRAPH ADAPTOR FOR LONG PLAYING RECORDS

Peter C. Goldmark, New Canaan, Conn., and Carl H. Youngquist, Brooklyn, N. Y., assignors to Columbia Broadcasting System, Inc., New York, N. Y., a corporation of New York Application March 3, 1949, Serial No. 79,333

10 Claims. (Cl. 179—100.4)

This invention relates to phonograph record players, and particularly to the provision of an adaptor for a player designed to reproduce standard high-speed coarse-groove records which enables such records and also low-speed fine-groove records to be played alternatively.

The standard phonograph record disk which has been available to the public for many years is a sound record disk rotating at 78 R. P. M. and having a sound groove spiral of the order of 100 convolutions per inch. The groove is laterally modulated in accordance with the sound to be reproduced and the maximum amplitude of excursion is approximately 0.002 inch. The tip radius of the stylus employed for reproducing these records is usually about 0.003 inch. The pickup arm weights commonly give a vertical force at the stylus of 30 grams or more, although in a few instances somewhat lighter arms have been used. The records are usually available in 10- and 12-inch sizes, the latter yielding a maximum playing time of approximately 4 minutes and 20 seconds on one side.

There have recently been made available fine-groove long-playing record disks having more than 200 grooves per inch and rotating at 33⅓ R. P. M. With a 12-inch diameter, such records yield maximum playing times in excess of 20 minutes per side. The maximum amplitude of excursion of the lateral modulation is of the order of 0.0009 inch. Due to the fine groove, the tip radius of the stylus is much smaller than for the previous standard record, and is approximately 0.001 inch. Very light stylus weights are employed, of the order of 6 grams.

Record players for playing the standard disks described above are widely in use. The turntable commonly rotates at only one speed, namely, 78 R. P. M., and a relatively heavy pickup with a coarse stylus is provided. It is highly desirable to make available a relatively simple and inexpensive adaptor which may be attached to such record players and enable them to play either standard records or the newly available long-playing records as described above. To accomplish this, it is necessary that two turntable speeds and a lightweight fine-stylus pickup be made available. The present invention is designed to provide such an adaptor.

In accordance with the invention a unit is provided which may be placed on a 78 R. P. M. turntable and, by simply engaging or disengaging an arm attached to an epicyclic train, a speed of 33⅓ R. P. M. or 78 R. P. M. may be obtained. A pickup arm is provided which has a switch for connecting either the fine-groove pickup or the coarse-groove pickup to an output circuit. The member provided for actuating the switch also serves as a stop for the turntable adaptor arm so that the proper pickup is employed for the selected turntable speed. Ordinarily the existing pickup will be used for playing standard records and connections will be made from this pickup to the switch.

The turntable adaptor unit is especially designed to provide a very smooth speed conversion free of vibration and slippage. At the same time it is especially designed to eliminate any vibration which would give rise to rumble when the adaptor turntable is rotating at 33⅓ R. P. M. This is highly important inasmuch as fine-groove records are necessarily recorded at a lower level than the coarse-groove records and any rumble would seriously affect the reproduction. It has been found that most 78 R. P. M. turntables are prone to produce rumble in the adaptor turntable unless special precautions are taken. Similarly, the fine-groove pickup may be mounted so as to insulate the pickup arm from vibrations which would produce rumble.

The invention will be more fully understood by reference to the following description of a specific embodiment thereof taken in conjunction with the drawings in which:

Fig. 1 is a plan view of the adaptor mounted on a conventional record player;

Fig. 2 is a vertical cross section of the fine-groove pickup arm taken along the line 2—2 of Fig. 1;

Fig. 5 is a perspective view of the bottom of the adaptor turntable mounting plate;

Fig. 6 is a plan view of the ball-bearing epicyclic train;

Fig. 7 is a perspective view of the spring clamp which holds together the turntable adaptor unit;

Fig. 8 shows the switch-actuating plate which serves as a turntable stop;

Fig. 9 is a side view of a modified pickup base;

Fig. 10 is a perspective view of the turntable adaptor unit; and

Fig. 11 is a circuit diagram showing the connections between switch and pickups.

Figure 3:
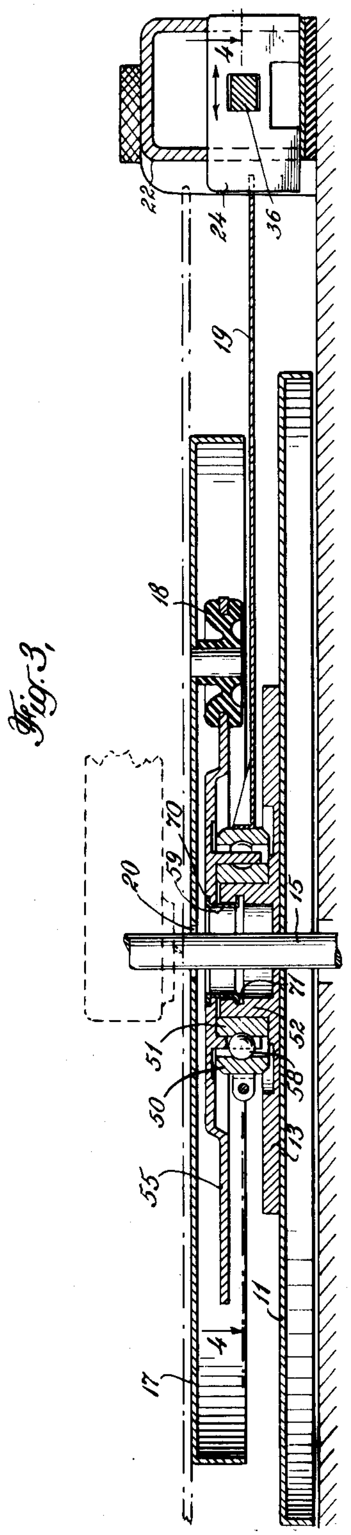
Fig. 3 is a vertical cross section of the adaptor mounted on a record player, taken along the line 3—3 of Fig. 1.

Referring to Fig. 1, a record player is shown having a mounting plate 10 on which a turntable 11 is mounted for rotation at 78 R. P. M. by a suitable driving mechanism (not shown). A pickup 12 is provided for playing conventional 78 R. P. M. coarse-groove records. Positioned on turntable 11 is a turntable adaptor unit shown in perspective in Fig. 10. The driving plate 13 has a central hole 14 which slips over spindle 15 on which turntable 11 rotates. The weight of the adaptor unit provides sufficient friction between driving plate 13 and the top of turntable 11 to establish a driving connection therewith. Due to the relatively light drag which a pickup produces in playing a record, sufficient friction is readily attainable to insure a non-slipping drive. The central hole 14 fits closely around the spindle and serves to locate the adaptor assembly coaxially on the turntable.

Plate 13 drives a driven plate 16 through an epicyclic train to be described hereinafter. An adaptor turntable 17 is mounted on driven plate 16 through resilient mounts 18 which provide vertical and lateral compliance so as to prevent turntable rumble.

Arm 19 is connected to a differential speed control element of the epicyclic train and serves to change the speed of rotation of adaptor turntable 17 with respect to the lower turntable 11. When arm 19 is engaged and restrained from rotating, the epicylic train provides a differential speed which causes the adaptor turntable 17 to rotate at 33⅓ R. P. M. when the lower turntable rotates at 78 R. P. M. When arm 19 is disengaged, the two turntables rotate at the same speed.

A pickup 21 adapted to play 33⅓ R. P. M. fine-groove records is mounted on a pickup base 22. Mounted inside the base is a switch 23 actuated by a manually slidable plate 24 serving also as a stop member for arm 19. The pickup base 22 is shown mounted in position for playing a record, and the arm 19 extends beyond the periphery of the lower turntable 11 in position to be engaged by plate 24 in one position thereof, thereby preventing arm 19 from rotating. In this position of plate 24, the adaptor turntable rotates at 33⅓ R. P. M. As will be described more fully hereinafter in connection with Fig. 11, in this position switch 23 connects pickup 21 to the output circuit. When plate 24 is moved to its other position it disengages arm 19, thus allowing the adaptor turntable to rotate at the same speed as the lower turntable, namely 78 R. P. M. Plate 24 simultaneously actuates switch 23 to connect the pickup 12 to the output circuit. Thus by a simple movement of plate 24, the speed of the adaptor turntable and switching of pickups may be effected.

Fig. 2 shows details of the fine-groove pickup. A pickup cartridge 25 is provided with a fine stylus 26 adapted to play fine-groove records. Cartridge 25 is mounted in arm 27 provided with a spindle 28 allowing lateral movement of the arm. Arm 27 is attached to spindle 28 through a flexible coupling consisting of a flat spring 29 sandwiched between two layers of resilient damping material 31, allowing vertical movement of the arm. Details of this pickup are described in copending application Serial No. 30,024, filed May 29, 1948 by Peter C. Goldmark. It is therefore unnecessary to describe it further. Other suitable pickups may be employed if desired. The pickup base 22 has threaded therein a bearing 32 in which spindle 28 rotates. The spindle is retained in position by means of a clip 33. Bearing 32 may be adjusted to a height suitable for allowing the pickup to engage a record at the proper angle, and may be locked in position by lock nut 34. A shielded lead 35 is connected to pickup cartridge 25 and passes through a hole in spindle 28 to the compartment containing switch 23.

The slide plate 24 has a hole 37 (Fig. 8) which encircles the switch actuating member 36. Thus as the slide plate 24 is moved back and forth it actuates the switch. The lower edge of slide 24 is cut out at 38 to allow lead 35 to pass therethrough.

After assembly of the components, the bottom of base 22 is closed by a plate 41 which has attached to the under surface thereof a layer of resilient material 42. The lower surface of layer 42 may be made sufficiently tacky to adhere to the mounting base 10 of the record player, or a separate adhesive may be employed if desired. Alternatively, another thin metal plate may be secured to the bottom of resilient layer 42 and provided with holes for rigidly securing the base 22 to the mounting plate 10.

As mentioned before, it is important to prevent vibrations of the record player from being transmitted to the pickup cartridge. Thus resilient layer 42 is advantageously made sufficiently thick to insulate the pickup from the mounting plate. In this manner turntable rumble may be reduced.

A connecting cable 43 leads from the pickup base 22 to the associated amplifier of the record player. A suitable rest 44 is provided for the pickup arm.

Figure 4:
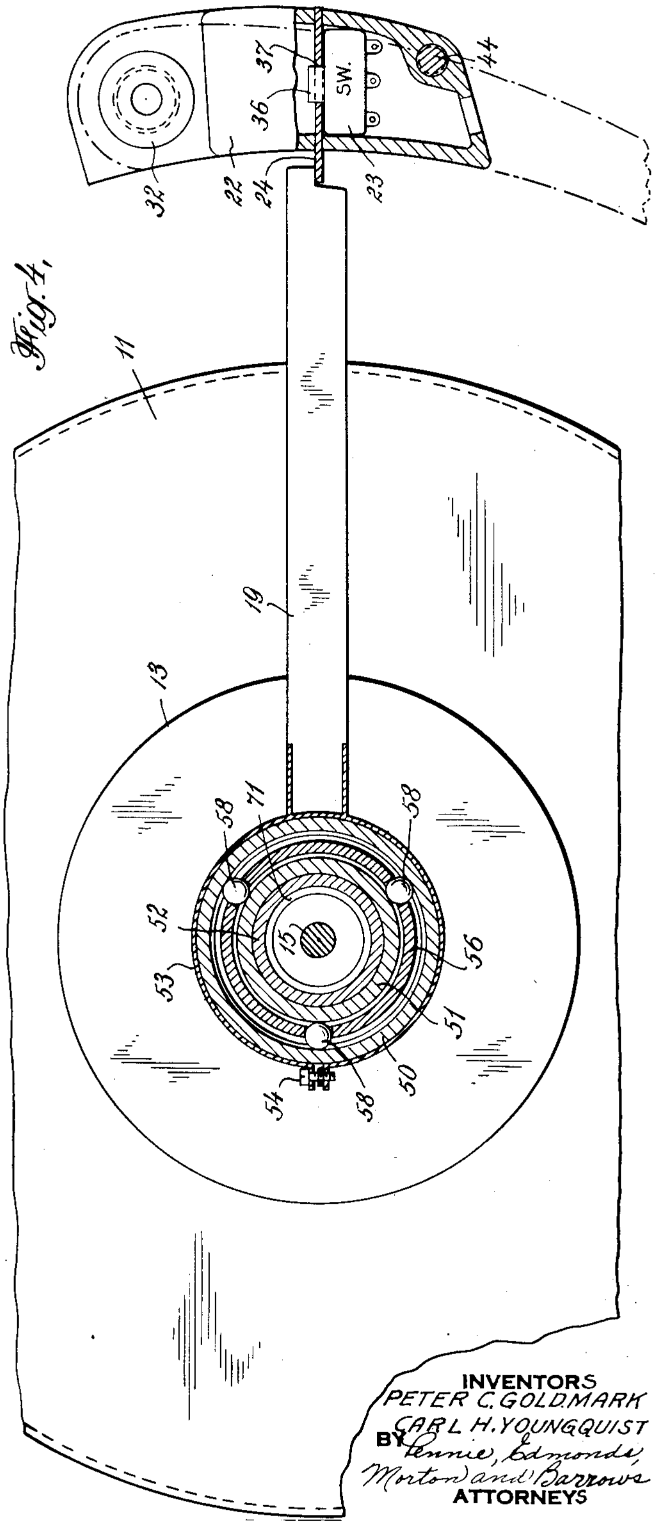
Fig. 4 is a horizontal cross section taken along the line 4—4 of Fig. 3.

Referring now to Figs. 3 and 4, the epicyclic train is shown which provides a differential speed between the turntable 11 and the adaptor turntable 17. The epicyclic train is advantageously a ball-bearing unit having an inner race 51 as the sun element, an outer race 50 as the ring element, and ball-bearings 58 cooperating with plate 55 as the planet element. The outer race 50 serves as a differential speed control element.

The inner race 51 is attached to an upstanding annular ring 52 which is integral with the driving plate 13. The arm 19 is attached to the outer race 50 by means of a clamp 53 tightened by screw 54. The driven plate 55 is provided with a downwardly extending annular ring 56 (Fig. 5) which has three slots 57 evenly spaced therearound. Annular ring 56 fits between the inner and outer races of the ball-bearing and the inner surface of ring 56 is machined to form a sliding fit with the outer edge of the inner race 51. This sliding fit forms a bearing surface between the driven plate 55 and the inner race 51. Ball-bearings 58 fit into slots 57 of the upper plate, thereby forming the planet element of the epicyclic train. The ball-bearings 58 are advantageously pressed tightly between the inner and outer races so that the load on the turntable will not cause appreciable slippage.

Adaptor turntable 17 is attached to the driven plate 55 by means of three resilient inserts 18 which provide resilience in both vertical and horizontal directions. Advantageously they are made of a relatively soft rubber of the shape shown. In this manner vibrations from the record player and lower turntable mechanism are prevented from reaching the adaptor turntable 17 and turntable rumble is prevented. The central hole 20 in the turntable 17 clears spindle 15.

The adaptor turntable assembly is held together by a spring clip 59 (Fig. 7) provided with ears 60. The clip fits into a central hole 70 in driven plate 55 and clears spindle 15. The inner surface of annular ring 52 is of slightly larger diameter so that there is no friction between it and the clip. However, the ears 60 on the lower side of the clip extend into the annular recess 71. Thus plates 13 and 55 are held together in an axial direction, but relative rotation therebetween is permitted.

In operation, when the arm 19 is disengaged, the inner ball race 51 is driven by the lower turntable through the driving plate 13 and rotates at 78 R. P. M. Since the outer race is free to rotate, the ball-bearings 58 move with the inner race and drive upper plate 55 at 78 R. P. M., thereby causing the adaptor turntable 17 to rotate at 78 R. P. M. There is sufficient friction in the coupling between plates 13 and 55 so that no slipping occurs between lower and upper turntables under normal conditions of use.

When arm 19 is engaged by slide 24 and prevented from rotating, the inner race continues to rotate at 78 R. P. M. but the outer race is stationary. This causes ball-bearings 58 to move in their orbit at a lower speed. The dimensions of the ball-bearings and the races are selected in accordance with the well-known principles of design of epicyclic trains so that the ball bearings move in their orbit at 33⅓ R. P. M. This drives plate 55 and the associated adaptor turntable at the same speed of 33⅓ R. P. M.

Fig. 9 shows a modification of the pickup base in which a thick layer of resilient material 61 is attached to the bottom of the base and provided with a thin mounting plate 62 which may have holes 63 therein for securing the base to the mounting board of the record player.

Fig. 11 shows a circuit diagram suitable for connecting the adaptor unit with the record player. The center conductor of a shielded cable 43 is connected to the blade of switch 23 and the outer shield is grounded. The output leads of the fine-groove pickup 21 are connected to the shield and to contact 64 of the switch, respectively. The output leads of the coarse-groove pickup 12 are connected to the outer shield and to the other contact 65 of the switch, respectively. When the switch plate 24 is moved into engagement with arm 19 of the turntable adaptor, it simultaneously establishes a circuit from fine-groove pickup 21 to the shielded cable and thence to an amplifier and loudspeaker for reproduction. When switch plate 24 is moved to the left, it releases arm 19 and simultaneously establishes a connection with contact 65 and hence connects the coarse-groove pickup 12 to the amplifier and loudspeaker.

The invention has been described in connection with a specific embodiment thereof which is preferred at the present time. It will be understood by those skilled in the art that many details may be changed within the spirit and scope of the invention.

We claim:

1. An adaptor for a record player having a relatively high-speed turntable to permit the alternative reproduction of relatively high-speed coarse-groove and relatively low-speed fine-groove disk records which comprises a turntable assembly for placement on said high-speed turntable, said assembly including an epicyclic train having driving and driven elements and a differential speed control element, means whereby said driving element is adapted to engage said turntable and establish a driving connection therewith, an adaptor turntable attached to said driven element, an arm attached to said differential speed control element, an arm having a fine-groove pickup for reproducing said fine-groove records and mounted on a pickup base, a switch in said base for alternatively connecting said fine-groove pickup and a coarse-groove pickup to an output circuit, and a stop member moveably mounted in said base to operate said switch, said stop member being adapted for engaging and disengaging said arm of the turntable assembly to change the speed of rotation of the adaptor turntable.

2. An adaptor for a record player having a tuntable and pickup for reproducing relatively high-speed coarse-groove disk records to permit the alternative reproduction of such records and relatively low-speed fine-groove disk records which comprises a turntable assembly for placement on said high-speed turntable, said assembly including an epicyclic train having driving and driven elements and a differential speed control element, means whereby said driving element is adapted to engage said turntable and establish a driving conection therewith, an adaptor turntable attached to said driven element, an arm attached to said differential speed control element, a pickup arm having a fine-groove pickup for reproducing said fine-groove records and mounted on a pickup base, a switch in said base for alternatively connecting said coarse and fine-groove pickups to an output circuit, and a stop member moveably mounted in said base to operate said switch, said stop member being adapted to engage and disengage said arm of the turntable assembly to change the speed of rotation of the adaptor turntable.

3. An adaptor for a record player having a turntable and pickup for reproducing relatively high-speed coarse-groove disk records to permit the alternative reproduction of such records and relatively low-speed fine-groove disk records which comprises a turntable assembly for placement on said high-speed turntable, said assembly including an epicyclic train having sun, ring and planet elements, a member attached to said sun element adapted to engage said turntable and establish a driving connection therewith, an adaptor turntable attached to said planet element, an arm attached to said ring element, a pickup arm having a fine-groove pickup for reproducing said fine-groove records and mounted on a pickup base, a switch in said base for alternatively connecting said coarse and fine-groove pickups to an output circuit, and a stop member moveably mounted in said base to operate said switch, said stop member being adapted to engage and disengage said arm of the turntable assembly to change the speed of rotation of the adaptor turntable.

4. An adaptor for a record player having a turntable and pickup for reproducing relatively high-speed coarse-groove disk records to permit the alternative reproduction of such records and relatively low-speed fine-groove disk records which comprises a turntable assembly for placement on said high-speed turntable, said assembly including an epicyclic train having a ball-bearing planet element and inner and outer ball races cooperating therewith, a member attached to said inner race adapted to engage said turntable and establish a driving connection therewith, an adaptor turntable attached to said planet element, an arm attached to said outer race of sufficient length to extend beyond the periphery of the high-speed turntable, a pickup arm having a fine-groove pickup for reproducing said fine-groove records and mounted on a pickup base, a switch in said base for alternatively connecting said coarse and fine-groove pickups to an output circuit, and a stop member moveably mounted in said base to operate said switch, said stop member being adapted to engage and disengage said arm of the turntable assembly to change the speed of rotation of the adaptor turntable.

5. An adaptor for a record player having a relatively high-speed turntable to permit the alternative reproduction of relatively high-speed coarse-groove and relatively low-speed fine-groove disk records which comprises a turntable assembly for placement on said high-speed turntable said assembly including an epicyclic train having a ball-bearing planet element and inner and outer ball races cooperating therewith, a driving plate attached to said inner race adapted to rest on said turntable and establish a driving connection therewith, a driven plate attached to said planet element, an adaptor turntable resiliently mounted on said driven plate with vertical and lateral compliance therebetween, an arm attached to said outer race of sufficient length to extend beyond the periphery of the high-speed turntable, a pickup arm having a fine-groove pickup for reproducing said fine-groove records and mounted on a pickup base, a switch in said base for alternatively connecting said fine-groove pickup and a coarse-groove pickup to an output circuit, and a stop member moveably mounted in said base to operate said switch, said stop member being adapted for engaging and disengaging said arm of the turntable assembly to change the speed of rotation of the adaptor turntable.

6. An adaptor for a record player having a turntable and pickup for reproducing relatively high-speed coarse-groove disk records to permit the alternative reproduction of such records and relatively low-speed fine-groove disk records which comprises a turntable assembly for placement on said high-speed turntable coaxial with the spindle thereof, said assembly including an epicyclic train having a ball-bearing planet element and inner and outer ball races cooperating therewith, a driving plate attached to said inner race adapted to rest on said turntable and establish a driving connection therewith, a driven plate attached to said planet element, an adaptor turntable resiliently mounted on said driven plate with vertical and lateral compliance therebetween, an arm attached to said outer race of sufficient length to extend beyond the periphery of the high-speed turntable, said epicyclic train rotating the adaptor turntable at the same speed as the high-speed turntable when the arm is unengaged and at said low speed when the arm is restrained from rotation, a pickup arm having a fine-groove pickup for reproducing said fine-groove records and mounted on a pickup base, said base being adapted for mounting on said record player and having a layer of resilient material at the bottom thereof for insulating the base from vibration, a switch in said base for alternatively connecting said coarse and fine groove pickups to an output circuit, and a stop member moveably mounted in said base to operate said switch, said stop member being adapted to engage and disengage said arm of the turntable assembly to change the speed of rotation of the adaptor turntable.

7. An adaptor for a record player having a turntable and pickup for reproducing relatively high-speed coarse-groove disk records to permit the alternative reproduction of such records and relatively low-speed fine-groove disk records which comprises a turntable assembly for placement on said high-speed turntable coaxial with the spindle thereof, said assembly including an epicyclic train having a ball-bearing planet element and inner and outer ball races cooperating therewith, a driving plate attached to said inner race adapted to rest on said turntable and establish a driving connection therewith, said driving plate having a central hole adapted to fit said spindle and locate the assembly on the high-speed turntable, a driven plate attached to said planet element, and adaptor turntable resiliently mounted on said driven plate with vertical and lateral compliance therebetween, said adaptor turntable clearing said spindle, a control arm attached to said outer race of sufficient length to extend beyond the periphery of the high-speed turntable, said epicyclic train rotating the adaptor turntable at the same speed as the high-speed turntable when the control arm is unengaged and at said low speed when the control arm is restrained from rotation, a pickup arm having a fine-groove pickup for reproducing said fine-groove records and mounted on a pickup base, said base being mounted on said record player and having a layer of resilient material at the bottom thereof for insulating from vibration, a switch in said base switchable to two positions for alternatively connecting said coarse and fine groove pickups to an output circuit, a slide member slidably mounted in said base and coupled to operate said switch, said slide member projecting beyond said pickup base in the position in which the switch connects the fine-groove pickup to the output circuit to engage said control arm to restrain rotation thereof and retracting toward the base in the other switch position to disengage said arm.

8. A pickup adaptor for a record player having a relatively high-speed turntable and a turntable adaptor unit to permit the alternative reproduction of relatively high-speed coarse-groove and relatively low-speed fine-groove disk records, said turntable adaptor unit having an adaptor turntable and an outwardly extending control arm which effects said low-speed rotation of the adaptor turntable when engaged and allows said high-speed rotation thereof when disengaged, said pickup adaptor comprising a pickup base, a pickup arm having a fine-groove pickup for reproducing said fine-groove disk records and mounted on said pickup base, a switch in said pickup base for alternatively connecting said fine-groove pickup and a coarse-groove pickup to an output circuit, and a stop member moveably mounted in said base to operate said switch, said stop member being moveable to project beyond said base in one switch position for engaging the control arm of a turntable adaptor unit and moveable to another switch position for disengaging said arm.

9. A pickup adaptor for a record player having a relatively high-speed turntable and a turntable adaptor unit to permit the alternative reproduction of relatively high-speed coarse-groove and relatively low-speed fine-groove disk records, said turntable adaptor unit having an adaptor turntable and control arm of sufficient length to extend beyond the peripheries of said turntables and adapted to effect low-speed rotation of the adaptor turntable when engaged and to allow high-speed rotation thereof when disengaged, said pickup adaptor comprising a pickup base, a pickup arm mounted on said base and having a pickup cartridge for reproducing said fine-groove records, a switch in said pickup base for alternatively connecting said fine-groove pickup cartridge and a coarse-groove pickup cartridge to an output circuit, a stop member moveably mounted in said base to operate said switch, said stop member being moveable to one switch position in which the member projects beyond said base for engaging said control arm and moveable to another switch position for disengaging said arm, and a layer of resilient material at the bottom of said pickup base for insulating the base from vibration.

10. A pickup adaptor for a record player and turntable adaptor unit to permit the alternative reproduction of relatively high-speed coarse-groove and relatively low-speed fine-groove disk records, said record player having a high-speed turntable and coarse-groove pickup and said turntable adaptor unit having an adaptor turntable and a control arm of sufficient length to extend beyond the peripheries of said turntables and adapted to effect low-speed rotation of the adaptor turntable when engaged and to allow high-speed rotation thereof when disengaged, said pickup adaptor comprising a pickup base, a pickup arm mounted on said base for lateral and vertical movement and having a pickup cartridge for reproducing said fine-groove records, a switch in said pickup base switchable to two positions for alternatively connecting said fine-groove pickup cartridge and said coarse-groove pickup to an output circuit, a slide member slidably mounted in said base and coupled to operate said switch, said slide member projecting beyond said pickup base in the position in which the switch connects the fine-groove cartridge to the output circuit for engaging said control arm to restrain movement thereof and retracting toward the base in the other switch position for disengaging said arm.

PETER C. GOLDMARK.
CARL H. YOUNGQUIST.

REFERENCES CITED

The following references are of record in the file of this patent:

UNITED STATES PATENTS

| Number | Name | Date |
|---|---|---|
| 1,852,456 | Fritz | Apr. 5, 1932 |
| 2,113,401 | Goldsmith | Apr. 5, 1938 |
| 2,353,370 | Sears | July 11, 1944 |